(12) United States Patent
Qu et al.

(10) Patent No.: US 10,909,146 B2
(45) Date of Patent: Feb. 2, 2021

(54) PROVIDING AUTOMATED HASHTAG SUGGESTIONS TO CATEGORIZE COMMUNICATION

(71) Applicant: MICROSOFT TECHNOLOGY LICENSING, LLC, Redmond, WA (US)

(72) Inventors: Shan Qu, Redmond, WA (US); Nithya Ramkumar, Redmond, WA (US); Yongjun Xie, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 319 days.

(21) Appl. No.: 14/960,456

(22) Filed: Dec. 7, 2015

(65) Prior Publication Data
US 2017/0161356 A1    Jun. 8, 2017

(51) Int. Cl.
| | |
|---|---|
| *G06F 16/00* | (2019.01) |
| *G06F 16/28* | (2019.01) |
| *G06F 16/248* | (2019.01) |
| *G06F 16/2455* | (2019.01) |
| *G06F 16/9535* | (2019.01) |
| *G06F 40/126* | (2020.01) |
| G06Q 50/00 | (2012.01) |

(52) U.S. Cl.
CPC .......... *G06F 16/285* (2019.01); *G06F 16/248* (2019.01); *G06F 16/2455* (2019.01); *G06F 16/9535* (2019.01); *G06F 40/126* (2020.01); G06Q 50/01 (2013.01)

(58) Field of Classification Search
CPC .......... G06F 17/30598; G06F 17/2217; G06F 17/30477; G06F 17/30554; G06F 16/285; G06F 16/2455; G06F 16/9535; G06F 16/248; G06Q 50/01
See application file for complete search history.

(56) References Cited

U.S. PATENT DOCUMENTS

| | | |
|---|---|---|
| 7,346,660 B2 | 3/2008 | Kulkarni |
| 7,447,706 B2 | 11/2008 | Chtcherbatchenko et al. |
| 8,126,863 B2 | 2/2012 | Williams et al. |

(Continued)

FOREIGN PATENT DOCUMENTS

| | | | | |
|---|---|---|---|---|
| WO | WO-2013066302 A1 * | 5/2013 | ........... | G06Q 10/107 |
| WO | 2015006797 A1 | 1/2015 | | |

OTHER PUBLICATIONS

Correa et al., Mining Tweets for Tag Recommendation on Social Media, 2011, ACM, All pages (Year: 2011).*

(Continued)

*Primary Examiner* — Taelor Kim
*Assistant Examiner* — Lahcen Ennaji
(74) *Attorney, Agent, or Firm* — Michael Best & Friedrich LLP

(57) ABSTRACT

Automated hashtag suggestions are provided to categorize a communication. A communication application initiates operations to categorize a communication in response to a detected input to categorize the communication with a hashtag. A hashtag source is queried for suggested hashtag (s). The suggested hashtag(s) is received from the hashtag source and stored in a hashtag cache. The suggested hashtag (s) is also presented upon retrieval of the suggested hashtag (s) from the hashtag cache.

15 Claims, 7 Drawing Sheets

(56) References Cited

U.S. PATENT DOCUMENTS

| | | | |
|---|---|---|---|
| 8,516,058 | B2 | 8/2013 | Stern et al. |
| 8,606,807 | B2 | 12/2013 | Drieschner |
| 8,843,568 | B2 | 9/2014 | Vitaldevara et al. |
| 8,943,045 | B2 | 1/2015 | Murthy |
| 9,009,162 | B1 | 4/2015 | Luo |
| 9,514,198 | B1* | 12/2016 | Haugen .................. G06Q 50/01 |
| 2007/0016575 | A1* | 1/2007 | Hurst-Hiller ..... G06F 17/30893 |
| 2009/0204577 | A1 | 8/2009 | Mayer-Ullmann et al. |
| 2010/0087179 | A1 | 4/2010 | Makavy et al. |
| 2011/0225193 | A1 | 9/2011 | Jennings et al. |
| 2011/0270937 | A1 | 11/2011 | Portilla |
| 2012/0265806 | A1* | 10/2012 | Blanchflower ........ G06Q 10/10 709/204 |
| 2013/0218835 | A1* | 8/2013 | Greenspan ............ G06F 17/301 707/610 |
| 2014/0181100 | A1* | 6/2014 | Ramer .................... H04L 67/22 707/728 |
| 2014/0181692 | A1 | 6/2014 | Gupta |
| 2014/0365880 | A1* | 12/2014 | Bellegarda .......... G06F 17/3097 715/261 |
| 2015/0081703 | A1 | 3/2015 | Murphy-Chutorian et al. |
| 2015/0178371 | A1* | 6/2015 | Seth ........................ H04L 67/10 707/748 |
| 2015/0220806 | A1* | 8/2015 | Heller ................... G06F 16/583 382/159 |
| 2015/0222617 | A1* | 8/2015 | Ebersman ............... H04L 51/12 726/4 |
| 2015/0227861 | A1* | 8/2015 | Everton ................. G06Q 10/06 705/342 |
| 2016/0224686 | A1* | 8/2016 | Ramanathan ......... G06F 16/951 |
| 2016/0328401 | A1* | 11/2016 | Dhawan .............. G06F 16/9535 |

OTHER PUBLICATIONS

Kywe et al., On Recommending Hashtags in Tweeter networks, Dec. 2012, ink.library.smu.edu.sg, All pages (Year: 2012).*

Iyengar, et al., "Web Caching, Consistency, and Content Distribution", in the Practical Handbook of Internet Computing, Jul. 23, 2004, 18 Pages.

"International Search Report and Written Opinion Issued in PCT Application No. PCT/US2016/062984", dated Feb. 7, 2017, 13 Pages.

Zangerle, et al., "Using Tag Recommendations to Homogenize Folksonomies in Microblogging Environments", in Proceedings of the 3rd International Conference on Social Informatics, Jan. 1, 2011, pp. 113-126.

"Twitter Hashtag Auto-complete Leads to Better Engagement", Published on: Jul. 11, 2013 Available at: https://www.hashtags.org/business/lists/twitter-hashtag-auto-complete-leads-to-better-engagement/.

"International Preliminary Report on Patentability Issued in PCT Application No. PCT/US2016/062984", dated Nov. 17, 2017, 6 Pages.

* cited by examiner

PROVIDING AUTOMATED HASHTAG SUGGESTIONS TO CATEGORIZE COMMUNICATION

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as handheld computers, smart phones, tablet devices, and comparable devices have become common. Such devices execute a wide variety of applications ranging from communication applications to complicated analysis tools. Many such applications facilitate communications.

One of the recent and increasingly popular developments in electronic communications (email, messaging, etc.) is the use of labels, tags, or hashtags to classify exchanged communications or portions of content therein. The popularity of hashtags, however, results in degradation of experience in their use due to high number of tags that can be used (practically, users may create any tag). Thus, slight typing errors in hashtags may result in mis-categorizations, missed communications, etc.

SUMMARY

This summary is provided to introduce a selection of concepts in a simplified form that are further described below in the Detailed Description. This summary is not intended to exclusively identity key features or essential features of the claimed subject matter, nor is it intended as an aid in determining the scope of the claimed subject matter.

Embodiments are directed to automated hashtag suggestions provided to categorize a communication. In some examples, a communication application may detect an input to categorize a communication with a hashtag. In response, a hashtag source may be queried for suggested hashtags. The suggested hashtags may be received from the hashtag source. Next, the suggested hashtags may be stored in a hashtag cache and presented.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
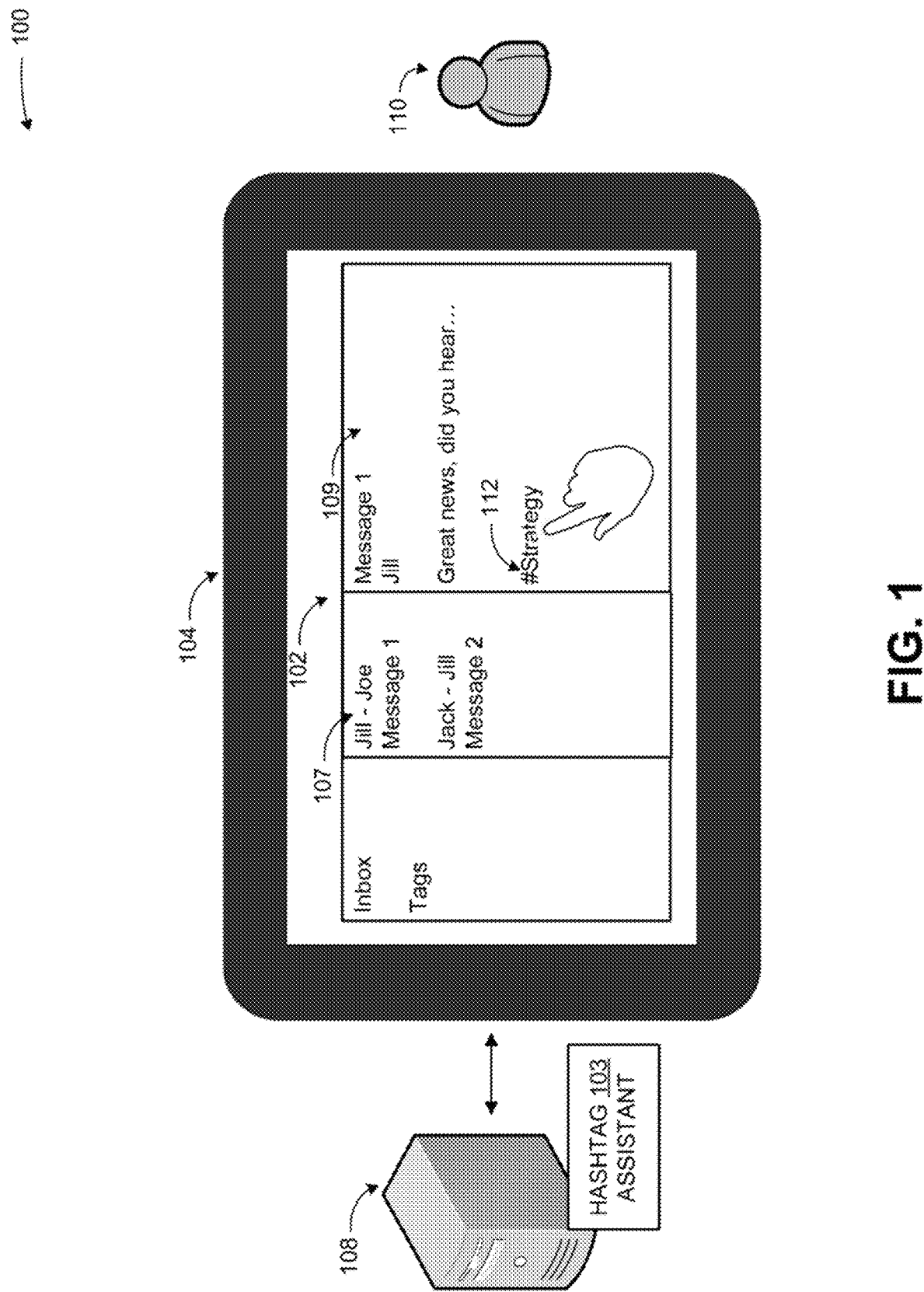
FIG. 1 is a conceptual diagram illustrating an example of providing automated hashtag suggestions to categorize a communication, according to embodiments.

As briefly described above, automated hashtag suggestions to categorize a communication may be provided by a communication application. The communication application may include an email processing application, a messaging application, a document processing application, a spreadsheet processing application, a presentation application, and/or a conferencing application, among others. In an example scenario, the communication application may detect an input, to categorize the communication with a hashtag. A communication may include an email, a message, and/or a video/audio conference, among others. A hashtag may include one or more words used to categorize the communication. The hashtag may include a subject, a topic, an interest, and/or a title, among other things associated with the communication.

A hashtag source may be queried for one or more suggested hashtags. The hashtag source may include a communication server that manages communications and relational attributes of the communications such as hashtags. The communication application may also interact with the hashtag source through a search application programming interface (API) that acts as an intermediary between the communication application and the hashtag source.

In response to the query, the suggested hashtags may be received from the hashtag source. The suggested hashtags may include a set of hashtags that are custom selected based on configuration attributes transmitted with the query. The suggested hashtags may be stored in a hashtag cache to allow for seamless access to the suggested hashtags for subsequent operations (such as restricting the number of suggested hashtags based on continued input). The suggested hashtags are presented by retrieving the suggested hashtags from the hashtag cache.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modifies may be located in both local and remote memory storage devices.

Some embodiments may be implemented, as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide automated hashtag suggestions to categorize a communication. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service dial enable the application or service to interact or communicate with one or more other applications and services managed by separate entities.

FIG. 1 is a conceptual diagram illustrating an example of providing automated hashtag suggestions to categorize a communication, according to embodiments.

In a diagram 100, a computing device 104 may execute a communication application 102. Examples of the communication application 102 may include an email processing application, a messaging application, a document processing application, a spreadsheet processing application, a presentation application, and/or a conferencing application, among others. The computing device 104 may include a tablet device, a laptop computer, a desktop computer, and a smart phone, among others. The computing device 104 may include a special purpose computing device configured to provide communications management through a display component configured to display communications, a communication component configured to transmit communications, and/or a storage component configured to store communications, among other components.

The computing device 104 may display the communication application 102 to a participant 110. The participant (such as a person) may receive and transmit a communication 109 (and other communications) to communicate with other participants. The participant 110 may be allowed to interact with the communication application 102 through an input device or touch enabled display component of the computing device 104. The computing device 104 may also include a display device such as the touch enabled display component, and a monitor, among others to provide the communication application 102 to the participant 110.

A rendering module of the communication application 102 may present communication summaries 107 of communications between the participant 110 and other participants. The rendering module may also display a communication 109 associated with one of the communication summaries. The communication 109 may include an email, a message, a video conference, and/or an audio conference, among others.

The rendering module may detect an input to categorize the communication 109 with a hashtag 112. In response, a suggestion module of the communication application 102 may query a hashtag source 108 for suggested hashtag(s). The hashtag source 108 may process the query through hashtag assistant component 103 which may generate the suggested hashtag(s). The suggested hashtag(s) may be received from the hashtag source 108 and stored in a hashtag cache for ease of access in subsequent operations. Next, the suggested hashtag(s) may be presented by retrieving the suggested hashtag(s) from the hashtag cache. The suggested hashtag(s) may be presented to allow the participant 110 to select the hashtag 112 from the suggested hashtag(s) and categorize the communication 109 with the hashtag 112.

The communication 109 may be stored and managed locally within the computing device 104. Alternatively, the communication 109 may be retrieved from the hashtag source 108 such as a content server, and/or a communication server, among others. The hashtag source 108 may also host and manage communications. An example of the hashtag source 108 may include an email server that provides communications to be presented by the communication application 102. Additionally, the computing device 104 may communicate with the hashtag source 108 through a network. The network may provide wired or wireless communications between nodes such as the computing device 104, or the hashtag source 108, among others.

Alternatively, the hashtag source 108 may provide the communication application 102. The computing device 104 may present a client user interface of the communication application 102 as provided by the hashtag source 108. The hashtag source 108 may execute operations associated with automated hashtag suggestions to categorize the communication 109.

The participant 110 may interact with the communication application 102 with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the computing device 104, the communication application 102, embodiments are not limited to these components or system, configurations and can be implemented with other system configuration employing fewer or additional components.

Figure 2:
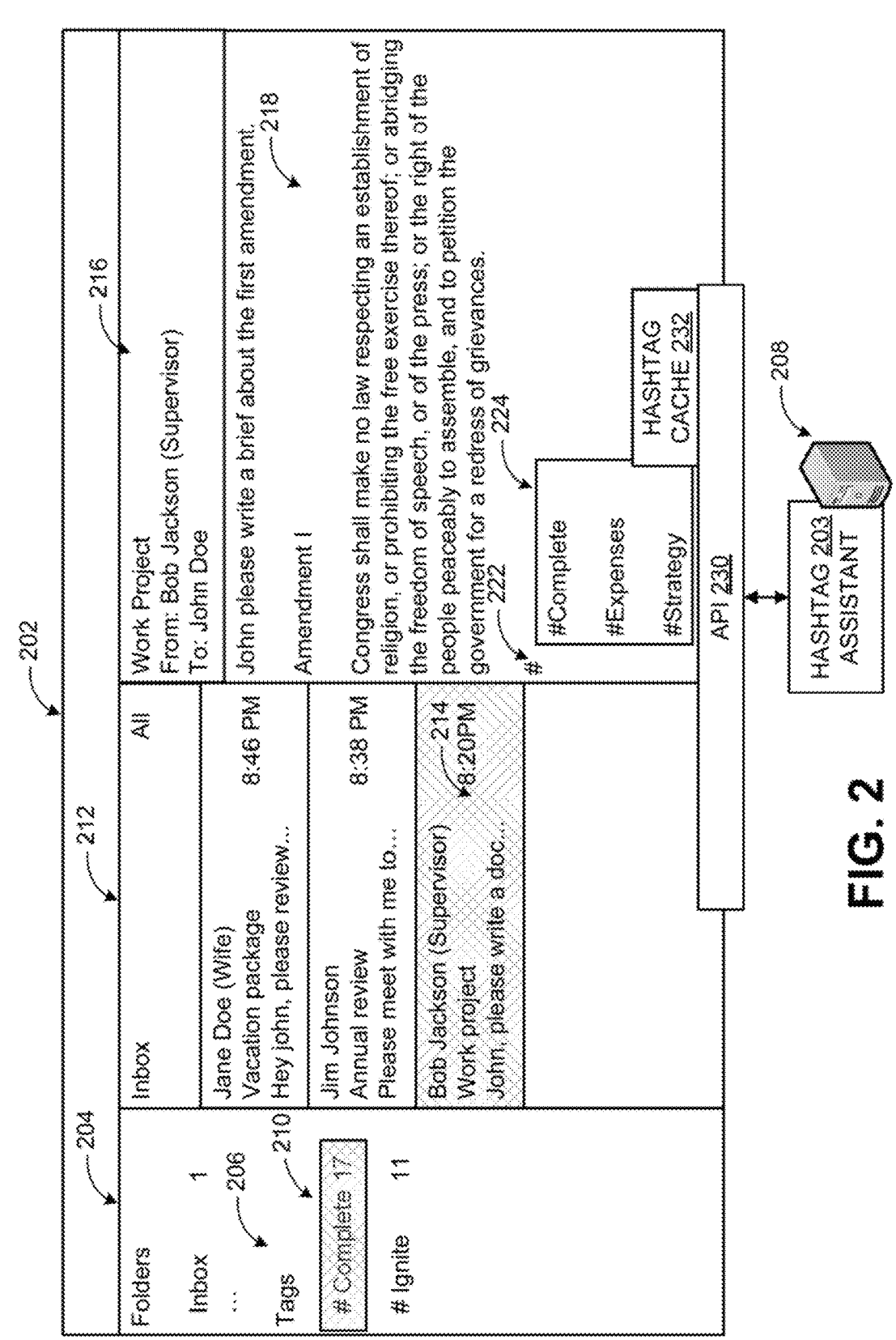
FIG. 2 is a display diagram illustrating an example of presenting automated hashtag suggestions in response to an input to categorize a communication, according to embodiments.

FIG. 2 is a display diagram illustrating an example of presenting automated hashtag suggestions in response to an input to categorize a communication, according to embodiments.

In a diagram 200, a communication application 202 may provide elements to organize a communication 216 with a hashtag. An example of the communication application 202 may include an email processing application. An example of a communication may include an email. An example of a hashtag may include a label or a description used to categorize the communication 216.

A rendering module of the communication application 202 may display a navigation user interface 204 to present navigation elements to interact with communications and hashtags that categorize the communications. The navigation user interface 204 may include a hashtag navigation section 206. The hashtag navigation section 206 may include a hashtag navigation element 210 with operations to display communication summaries. The communication summaries may refer to communications that are categorized with a hashtag associated with the hashtag navigation element 210. The hashtag navigation element 210 may include an actionable hashtag and a counter that reflects the number of the communications organized by the hashtag.

The summaries user interface 212 may include summaries of the communications. A summary 214 of the communication 216 may include information such as a sender, a subject, a time received (and/or sent), and/or a summary of the content, among others. The rendering module of the communication application 202 may display the communication 216 in response to an action detected on the summary 214 (associated with the communication 216). The communication 216 may include information such as a subject, a sender, a participant (such as a receiver and/or an organizer), a time received (and/or sent), and/or a content 218 of the communication 216.

The rendering engine of the communication application 202 may also detect an input 222 to categorize the communication 216 with a hashtag. The input 222 may start with a hashtag character (such as a hash character, and/or a number sign, among others). The input 222 may also start with (or the hashtag character may include) another specialized character, an image, and/or graphic, among others to indicate start of a hashtag. In response to the input 222, a suggestion module of the communication application 202 may query a hashtag source 208 for one or more suggested hash tags 224.

A search API 230 may be used to interact with a hashtag assistant component 203 of the hash tag source 208.

The hashtag assistant component 203 may analyze attributes of the query to locate the suggested hashtags 224. For example, a query to locate and receive suggested hashtags associated with a project, a task, and/or a deadline, among similar ones may be transmitted through the search API 230 to the hashtag assistant component 203. The hashtag assistant component 203 may process attributes of the query to locate hashtags matching the attributes in the hashtag source 208. The located hashtags may be transmitted to the search API 230 for a presentation as the suggested hashtags 224. Alternatively, the located hashtags may be transmitted to a new API such as a tag completion API for a presentation as the suggested hashtags 224.

The suggested hashtags 224 received through the search API 230 may be stored in a hashtag cache 232. The suggested hashtags 224 may be stored in the hashtag cache 232 for fast and seamless access in subsequent operations associated, with the suggested hashtags 224. Next, the suggested hashtags 224 may be provided for a presentation by the rendering module of the communication application 202.

In an example scenario, the rendering module of the communication application 202 may detect a configuration request (by a participant) to order the suggested hashtags based on a frequency of usage. Alternatively, the suggested hashtags may also be ordered automatically based on a contextual information associated with a participant (such as usage trends associated with the participant or stakeholders important to the participant). In response, the suggestion module of the communication application 202 may transmit the configuration request to the hashtag assistant component 203 of the hashtag source 208. The configuration request may be transmitted through the search API 230 which may act as an intermediary between the communication application 202 and the hashtag source 208. The search API 230 may translate commands between the communication application 202 and the hashtag source 208 to allow an interaction between the two nodes regardless of formatting used to generate the commands.

The suggestion module of the communication application 202 may receive the suggested hashtags 224 (through the search API 230). The suggested hashtags 224 may be ordered based on a range from a frequent usage to a seldom usage (such as a highest usage to a lowest usage). The hashtag cache 232 may be overwritten with the sorted suggested hashtags. Next, the hashtag cache 232 may be accessed to retrieve the sorted suggested hashtags and to overwrite the suggested hashtags 224 with the sorted suggested hashtags.

Alternatively, the rendering module of the communication application 202 may receive a configuration request to order the suggested hashtags 224 based on a recentness of usage. In response, a suggestion module of the communication application 202 may transmit the configuration request (through, the search API 230) to the hashtag assistant component 203 of the hashtag source 208. The hashtag assistant component 203 may sort the suggested hashtags 224 (hosted by the hashtag source 208) based on a range from a recent usage to a distant usage (such as a most recent usage and a least recent usage). The sorted suggested hashtags may be transmitted (through the search API) to the suggestion module of the communication application 202.

The suggestion module of the communication application 202 may receive the sorted suggested, hashtags. The hashtag cache 232 may be overwritten with the sorted suggested hashtags. Next, the hashtag cache 232 may be accessed to retrieve the sorted suggested hashtags and overwrite a presentation of the suggested hashtags 224 with the sorted suggested hashtags.

Furthermore, a content 218 of the communication 216 may be parsed by the suggestion module of the communication application 202 to identify context information associated with the communication. Context information may include a topic, a subject, a category, an interest, a role, a location, and/or a status, among others associated with the communication 216. The context information may be transmitted to the hashtag assistant component 203 of the hashtag source 208 to prompt the hashtag assistant component 203 to generate the suggested hashtags 224 from the context information. The hashtag assistant component 203 may search the hashtags hosted by the hashtag source 208 with the context information. Matching hashtags may be transmitted through the search API 230 for a reception as the suggested hashtags 224. The suggested hashtags 224 may be stored in the hashtag cache 232 and presented.

In another example scenario, account information associated with a participant may be received by the suggestion module of the communication application 202. The participant may be an entity that, provides the input 222. A request may be transmitted to the hashtag assistant component 203 component of the hashtag source 208 to prompt the hashtag assistant component 203 to select the suggested hashtags 224 based, on a previous usage in association with the account information. Previous usage may include a number of usage and a recentness of usage in association with the account information. Other account information associated with the participant or other participants may also be processed to customize suggested hashtags 224 based on the other account information.

Figure 3:
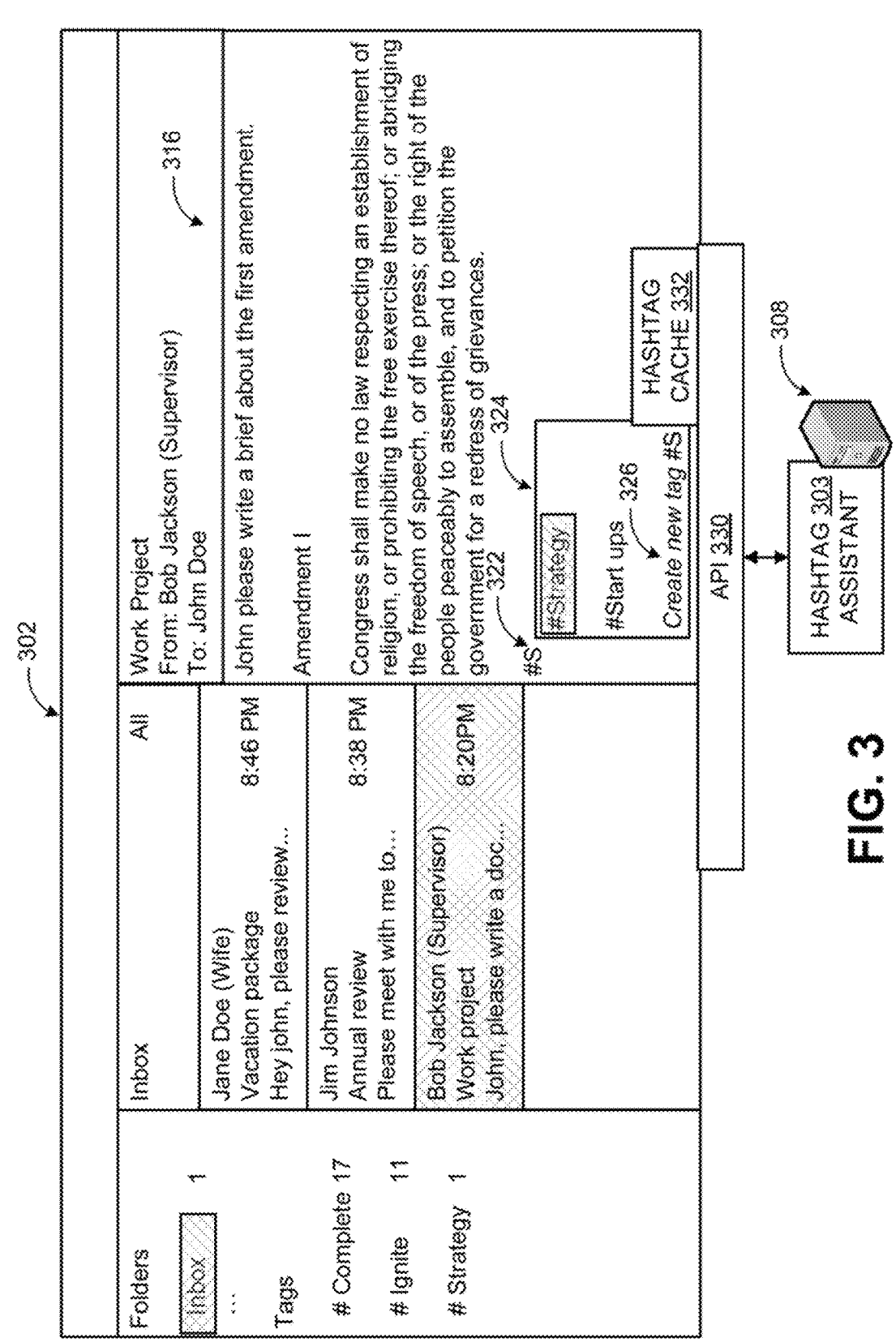
FIG. 3 is a display diagram illustrating an example of focusing presented hashtag suggestions based on continued input, according to embodiments.

FIG. 3 is a display diagram illustrating an example of focusing presented hashtag suggestions based on continued input according to embodiments.

In a diagram 300, a communication application 302 may focus suggested hashtags 224 based on a continued input 322 by a participant. The participant may wish to categorize a communication 316 with a hashtag and provide an input that starts with a hashtag character to initiate a process to categorize the communication 316. In response, a suggestion module of the communication application 302 may query for suggested hashtags 324 from a hashtag assistant component 303 of a hashtag source 308 through a search API 330. The suggested hashtags 324 received from the hashtag assistant component 303 (through the search API 330) may be stored in a hashtag cache 332 and presented.

A rendering module of the communication application 302 may detect a continued input 322 to focus the suggested hashtags 224. The continued input 322 may include another character such as a letter to filter the suggested hashtags 224 based on the continued input 322. For example, a letter "S" may be detected as a continued input 322 to categorize the communication 316 with a hashtag that starts with the letter "S". In response, the suggestion module may search the hashtag cache 332 for a focused subset of the suggested hashtags 224. The focused subset of the suggested hashtags may be presented as the suggested hashtags 324 that overwrite the suggested hashtags 224.

A participant of the communication 316 may also be provided with user interface elements to create a new hashtag 326 based on the continued input 322. User interface elements may be provided to capture additional input and categorize the communication 316 with the new hashtag 326. The new hashtag 326 may be transmitted (through the search API) to the hashtag assistant component 303 of the hashtag source 308 for management.

Figure 4:
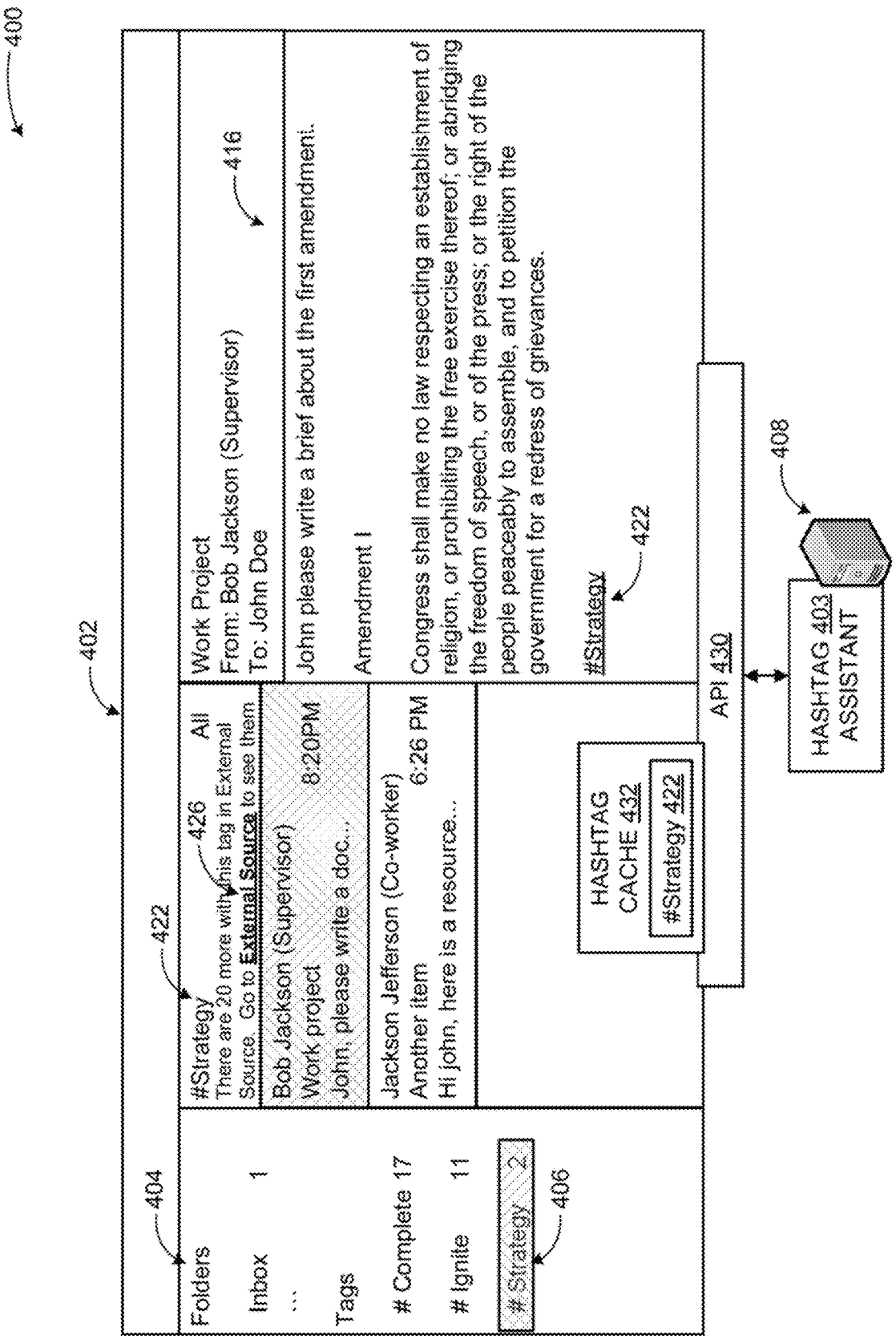
FIG. 4 is a display diagram illustrating an example of hashtag search and management operations to maintain suggested hashtags, according to embodiments.

FIG. 4 is a display diagram illustrating an example of hashtag search and management operations to maintain suggested hashtags, according to embodiments.

In a diagram 400, a communication application 402 may detect an action on a hashtag 422 used to categorize a communication 416. In response to the action on the hashtag 422, a rendering engine of the communication application 402 may highlight a hashtag navigation element 406 on a navigation user interface of the communication application 402. The rendering module may also present communication summaries of the communication 416 and other communications categorized by the hashtag 422 in a summaries user interface. Alternatively, the hashtag navigation element 406 may provide operations to display communication summaries of the communications associated with the hashtag 422 within a summaries user interface of the communication application 402. The hashtag 422 may also be used as a label for the summaries user interface.

The suggestion module of the communication application 402 may receive a request to transmit new hashtag(s) used to categorize the communication 416 (or other communication(s)) from a hashtag assistant component 403 of a hashtag source 408 (through a search API 430). In response, a hashtag cache 432 may be analyzed to identity the new hashtag(s) (such as the hashtag 422) used to update the hashtag cache 432. Next, the new hashtag(s) may be transmitted to the hashtag assistant component 403 (through the search API 430) to prompt the hashtag source 408 to manage the new hashtag(s).

In an example scenario, a suggestion module of the communication application 402 may detect a request to transmit the hashtag 422 used to categorize the communication 416 (or other communication(s)). The communication 416 and/or other communication(s) may be searched for the hashtag 422. Next, the hashtag 422 may be transmitted to the hashtag assistant component 403 (through the search API 430) to prompt the hashtag source 408 to manage the hashtag 422.

In another example scenario, the suggestion module of the communication application 402 may query an external source 426 (such as a professional service provider and/or a social networking provider, among others) with the hashtag 422 to identify external communications) categorized with the hashtag 422. The external communication(s) may be also be detected as categorized with external hashtag(s). The external hashtag(s) may be queried and received from the external source. The hashtag cache 432 may be updated with the external hashtag(s) as options to select a hashtag to categorize the communication 416 in future actions. The external hashtag(s) may also be transmitted (through the search API 430) to the hashtag assistant component 403 of the hashtag source 408 for management. Furthermore, user interface elements to access the external communication(s) and the external hashtag(s) may be provided in association with the external source.

As discussed above, the application may be employed to perform operations to automate hashtag suggestions to categorize a communication. An increased user efficiency with the communication application 102 may occur as a result of searching and providing suggested hashtags to categorize a communication. Additionally, presenting suggested hashtag (s) in association with a hashtag input on user interfaces of the communication application 102 may reduce processor load, increase processing speed, conserve memory, and reduce network bandwidth usage.

Embodiments, as described herein, address a need that arises from a lack of efficiency between the participant 110 interacting with the communication application 102 of the computing device 104. The actions/operations described herein are not a mere use of a computer, but address results that are a direct consequence of software used as a service offered to large numbers of users and applications.

The example scenarios and schemas in FIG. 1 through 4 are shown with specific components, data types, and configurations. Embodiments are not limited to systems according to these example configurations. Automated hashtag suggestions to categorize a communication may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
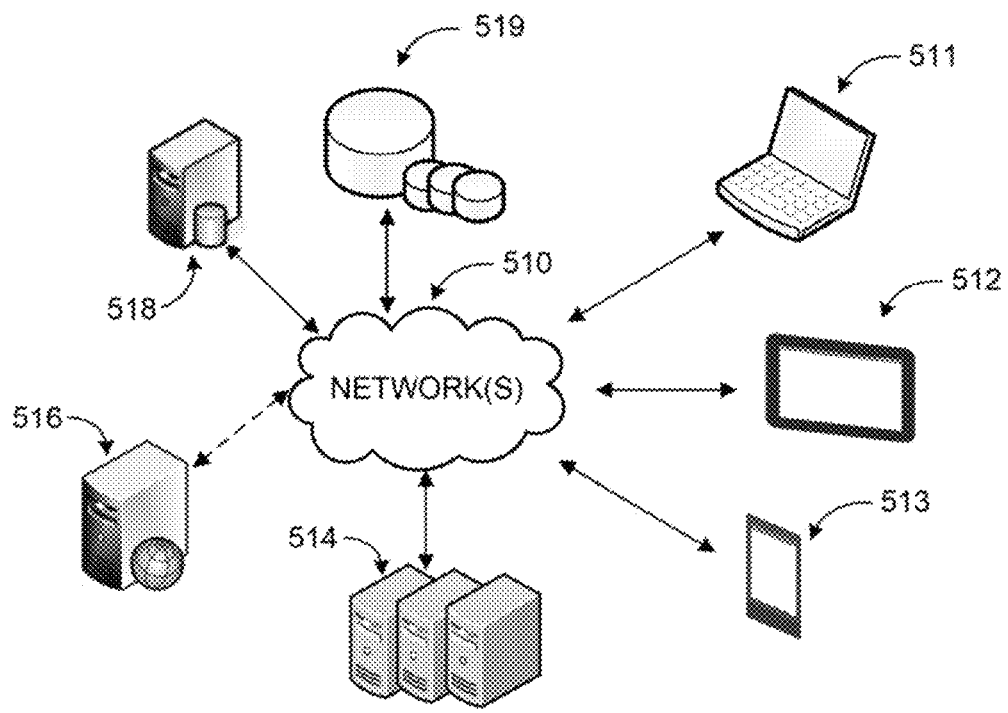
FIG. 5 is a simplified networked environment, where a system according to embodiments may be implemented.

FIG. 5 is an example networked environment, where embodiments may be implemented. A communication application configured to provide automated hashtag suggestions to categorize a communication may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A communication application may detect an input to categorize a communication with a hashtag. In response, a hashtag source may be queried for suggested hashtag(s). The suggested hashtag(s) may be received from the hashtag source and stored in a hashtag cache. The suggested hashtag(s) may be presented by retrieving the suggested hashtag(s) from the hashtag cache. The communication application may store data associated with the hashtag and the communication in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide automated hashtag suggestions to categorize a communication. Furthermore, the networked environments discussed in FIG. 5 are for illustration purposes only. Embodiments are not limited to the example applications, modules, or processes.

Figure 6:
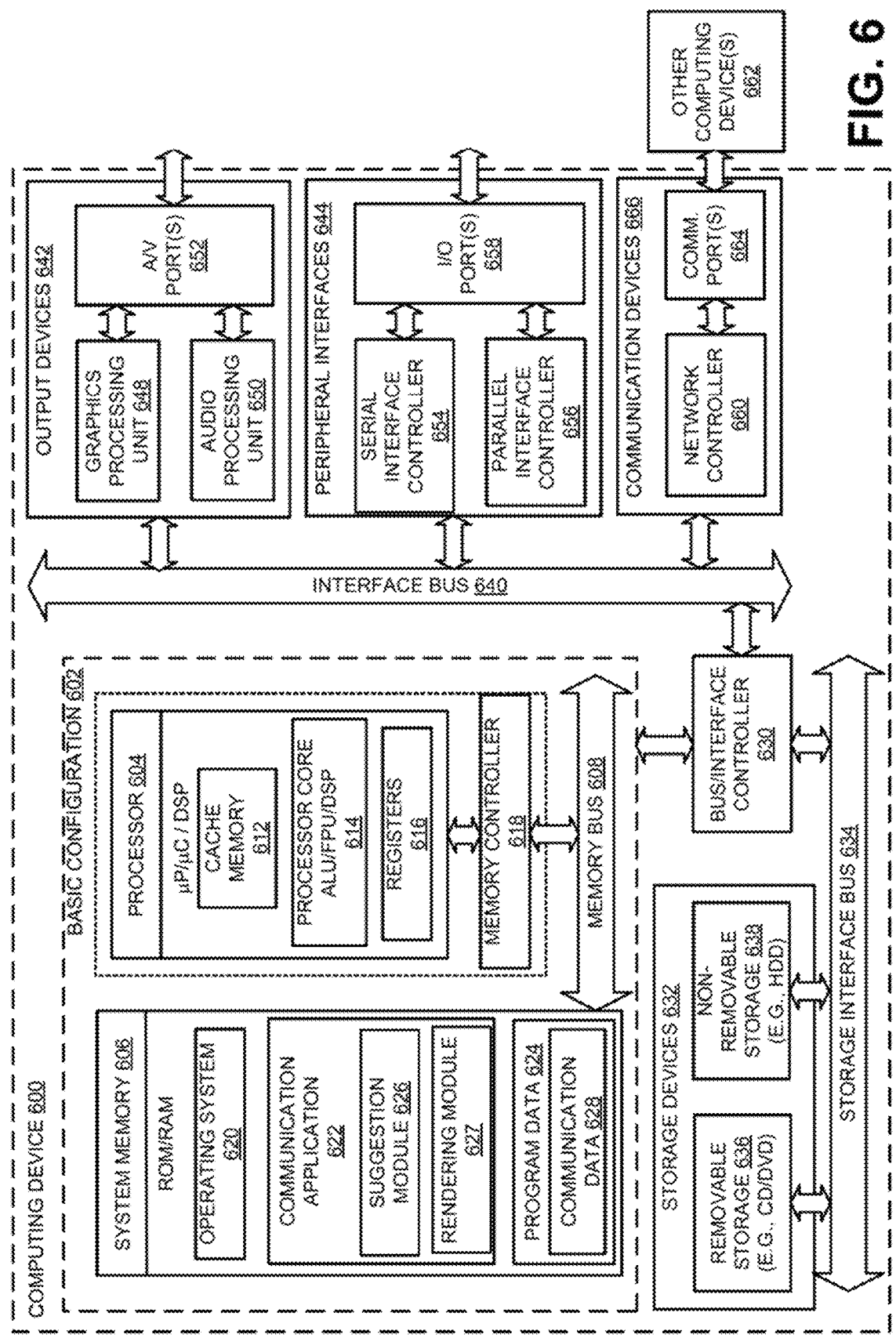
FIG. 6 is a block diagram of an example computing device, which may be used to provide automated hashtag suggestions to categorize a communication, according to embodiments.

FIG. 6 is a block diagram of an example computing device, which may be used to provide automated hashtag suggestions to categorize a communication, according to embodiments.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a communication application 622, and a program data 624. The communication application 622 may include components such as a suggestion module 626 and a rendering module 627. The suggestion module 626 and the rendering module 627 may execute the processes associated with the communication application 622. The rendering module 627 may detect an input to categorize a communication with a hashtag. In response, the suggestion module may query a hashtag source for suggested hashtag(s). The suggested hashtag(s) may be received from the hashtag source and stored in a hashtag cache. The rendering module 627 may present the suggested hashtag(s) by retrieving the suggested hashtag(s) from the hashtag cache.

Components of the communication application 622 (such as a user interface) may also be displayed on a display device associated with the computing device 600. An example of the display device may include a hardware screen that may be communicatively coupled to the computing device 600. The display device may include a touch based device that detects gestures such as a touch action. The display device may also provide feedback in response to detected gestures (or any other form of input) by transforming a user interface of the communication application 622, displayed by the touch based device. The program data 624 may also include, among other data, communication data 628, or the like, as described herein. The communication data 628 may include a hashtag, and/or a communication, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interlace bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interlace bus 640 for facilitating communication from various interface devices (for example, one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such, as a carrier wave or other transport mechanism, and may include any information delivery media. A "modulated data signal" may be a signal, that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to provide automated hashtag suggestions to categorize a communication. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
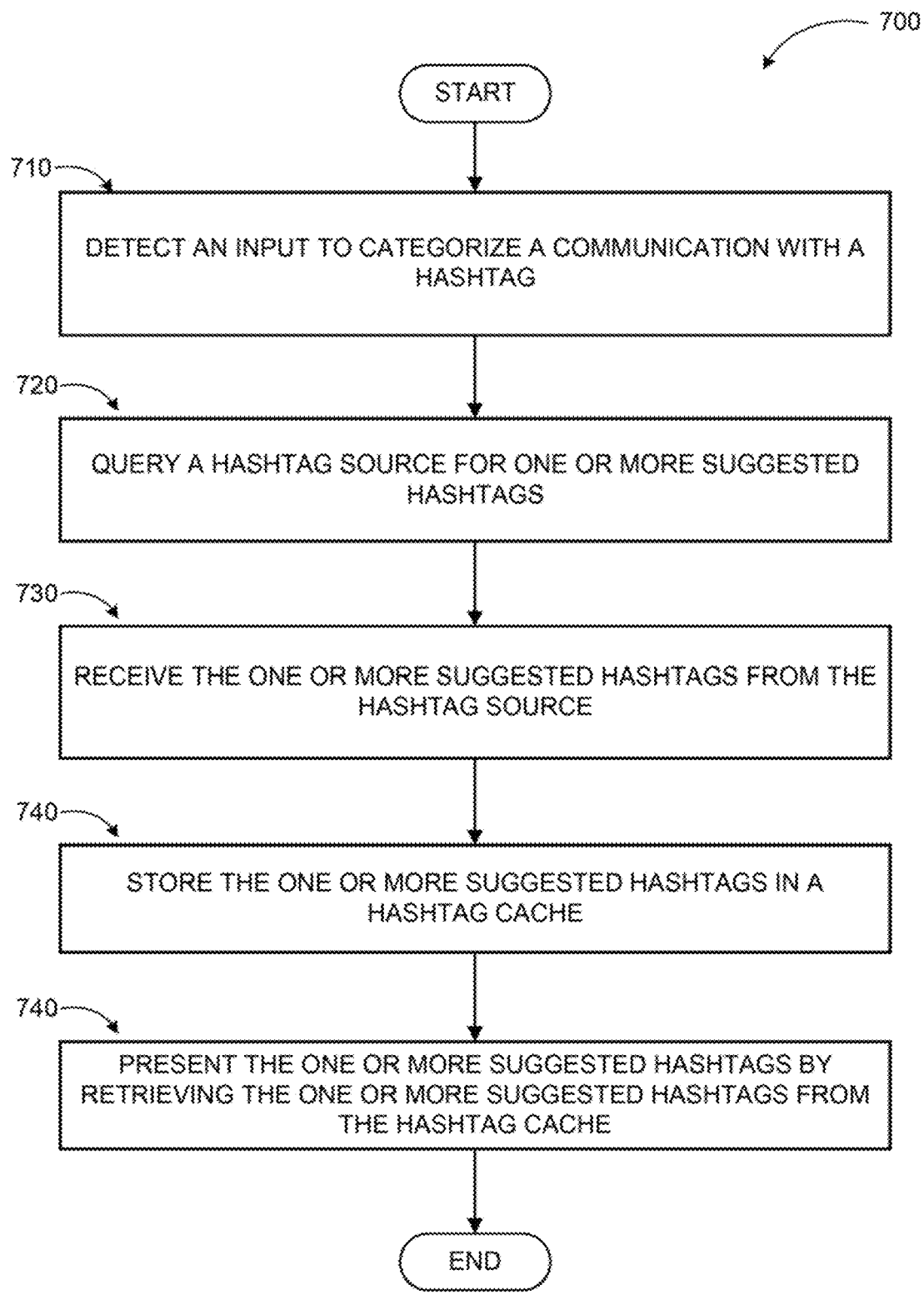
FIG. 7 is a logic flow diagram illustrating a process for providing automated hashtag suggestions to categorize a communication, according to embodiments.

FIG. 7 is a logic flow diagram illustrating a process for providing automated hashtag suggestions to categorize a communication, according to embodiments. Process 700 may be implemented on a computing device, such as the computing device 600 or another system.

Process 700 begins with operation 710, where a communication application may detect an input to categorize a communication with a hashtag. The hashtag may include a label or a description to provide a relationship between the communication and another entity (such as another communication, and/or a participant, among others). A hashtag source may be queried for suggested hashtag(s) at operation 720. The hashtag source may include a communication service provider that hosts and manages hashtags and/or communications.

At operation 730, the suggested hashtag(s) may be received from the hashtag source. The suggested hashtag(s) may be transmitted through a search API of the communication application. Next, the suggested hashtag(s) may be stored in a hashtag cache at operation 740. The hashtag cache may be used for seamless access to the suggested hashtag(s) in subsequent operations associated with categorization of the communication. At operation 750, the suggested hashtag(s) may be presented by retrieving the suggested hashtag(s) from the hashtag cache.

The operations included in process 700 are for illustration purposes. Providing automated hashtag suggestions to categorize a communication may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

In some examples, a computing device for pro viding automated hashtag suggestions to categorize a communication is described. The computing device includes a display device, a memory configured to store instructions associated with a communication application, and one or more processors coupled to the memory and the display device. The one or more processors execute the communication application in conjunction with the instructions stored in the memory. The communication application includes a rendering module and a suggestion module. The rendering module is configured to detect an input to categorize the communication with a hashtag. The suggestion module is configured to query a hashtag source for one or more suggested hashtags, receive the one or more suggested hashtags from the hashtag source, store the one or more suggested hashtags in a hashtag cache, and provide the one or more suggested hashtags for a presentation by the rendering module, where the one or more suggested hashtags are retrieved from the hashtag cache.

In other examples, the input starts with a hashtag character. The rendering module is further configured to detect, on the display device, a configuration request to order the one or more suggested hashtags based on a frequency of usage and provide the configuration request to the suggestion module. The suggestion modules is further configured to transmit the configuration request to the hashtag source, receive one or more sorted suggested hashtags, where the one or more sorted suggested hashtags are ordered based on a range from a frequent usage to a seldom usage, and overwrite the hashtag cache with the one or more sorted suggested hashtags.

In further examples, the rendering module Is further configured to detect, on the display device, a configuration request to order the one or more suggested hashtags based on a recentness of usage and provide the configuration request to the suggestion module. The suggestion module is further configured to transmit the configuration request to the hashtag source, receive one or more sorted suggested hashtags, where the one or more sorted suggested hashtags are ordered based on a range from a recent usage to a distant usage, and overwrite the hashtag cache with the one or more sorted suggested hashtags.

In other examples, the rendering module is further configured to detect, on the display device, a continued input to filter the one or more suggested hashtags, where the continued input includes one or more alphanumeric characters and provide the continued input to the suggestion module. The suggestion module is further configured to search the hashtag cache for a focused subset of the one or more suggested hashtags, where the focused subset of the one or more suggested hashtags match the input and the continued input and provide the focused subset of the one or more suggested hashtags to update the presentation by the rendering module.

In further examples, the suggestion module is further configured to parse a content of the communication to identify context information associated with the communication and transmit the context information to the hashtag source to prompt the hashtag source to generate the one or more suggested hashtags from the context information. The context information includes one or more of a topic, a subject, a category, an interest, a role, a location, and a status associated with the communication. The suggestion modules is further configured to receive account information associated with a participant associated with the input, transmit, to the hashtag source, a request to select the one or more suggested hashtags based on a previous usage in association with the account information, and provide the one or more suggested hashtags that are selected based on the previous usage in association with the account information.

In some examples a method executed on a computing device for providing automated hashtag suggestions to categorize a communication is provided. The method includes detecting an input to categorize the communication with a hashtag, where the input starts with a hashtag character, querying a hashtag source for one or more suggested hashtags through a search application programming interface (API), receiving the one or more suggested hashtags from the hashtag source through the search API, storing the one or more suggested hashtags in a hashtag cache, and presenting the one or more suggested hashtags that are retrieved from the hashtag cache.

In other examples, the method further includes detecting an action to categorize the communication with a new hashtag and transmitting the new hashtag to the hashtag source for management. The method further includes detecting a request to transmit one or more new hashtags used to categorize one or more of the communication and one or more other communications, analyzing the hashtag cache to identify the one or more new hashtags used to update the hashtag cache, and transmitting, through the search API, the one or more new hashtags to the hashtag source for management.

In further examples, the method further includes detecting a request to transmit one or more hashtags used to categorize one or more of the communication and one or more other communications, searching the communication and the one or more other communications for the one or more hashtags used to categorize one or more of the communication and one or more other communications, and transmitting, through the search API, the one or more hashtags to the hashtag source for management. The method further includes querying an external source with the hashtag to identify one or more external communications categorized with the hashtag, where the one or more external communications are further categorized with one or more external hashtags, receiving the one or more external hashtags, updating the hashtag cache with the one or more external hashtags, and transmitting, through the search API, the one or more external hashtags to the hashtag source for management.

In some examples, a computer-readable memory device with instructions stored thereon for providing automated hashtag suggestions to categorize a communication is described. The instructions include actions that are similar to the actions of the method.

In some examples, a means for providing automated hashtag suggestions to categorize a communication is described. The means for providing automated hashtag suggestions to categorize a communication includes a means for detecting an input to categorize the communication with a hashtag, a means for querying a hashtag source for one or more suggested hashtags, a means for receiving the one or more suggested hashtags from the hashtag source, a means for storing the one or more suggested hashtags in a hashtag cache, and a means for providing the one or more suggested hashtags for a presentation by the rendering module, where the one or more suggested hashtags are retrieved from the hashtag cache.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device for providing automated hashtag suggestions to categorize a communication, the computing device comprising:
  a memory configured to store instructions associated with a communication application;
  one or more processors coupled to the memory, the one or more processors executing the communication application in conjunction with the instructions stored in the memory, wherein the one or more processors are configured to:
    detect a first input to categorize a first communication with a hashtag;
    query an external source for a first set of one or more suggested hashtags for the first communication;
    receive the first set of one or more suggested hashtags for the first communication from the external source;

store the first set of one or more suggested hashtags for the first communication in a hashtag cache for access in subsequent operations associated with the one or more suggested hashtags;

provide the first set of one or more suggested hashtags for the first communication to be displayed, wherein the one or more suggested hashtags for the first communication are retrieved from the hashtag cache;

in response to receiving a selection of one suggested hashtag from the first set of one or more suggested hashtags:
associate the first communication with the selected one suggested hashtag;
transmit the selected one suggested hashtag to a hashtag source separate from the external source;
identify an additional communication categorized with the selected one suggested hashtag and an additional hashtag also associated with the additional communication, the additional hashtag being different from the selected hashtag; and
store the additional hashtag in the hashtag cache; and in response to receiving a second input from a participant to categorize a second communication with a hashtag, query the hashtag cache and the hashtag source for a second set of one or more suggested hashtags for the second communication and provide the second set of one or more suggested hashtags for the second communication to be displayed to the participant, the second set of one or more suggested hashtags for the second communication including the additional hashtag and another hashtag obtained from the hashtag source, wherein querying the hashtag source includes transmitting, to the hashtag source, a request to select the another hashtag based on at least one selected from a group consisting of (a) previous usage of hashtags associated with account information of the participant, (b) a recentness of usage of hashtags, (c) a frequency of usage of hashtags, and (d) context information associated with the second communication.

2. The computing device of claim 1, wherein the first input starts with a hashtag character.

3. The computing device of claim 1, wherein the one or more processors are further configured to:
detect a configuration request to order the second set of one or more suggested hashtags based on a frequency of usage; and
provide the configuration request to the communication application.

4. The computing device of claim 3, wherein the one or more processors are further configured to:
transmit the configuration request to the hashtag source;
receive one or more sorted suggested hashtags, wherein the one or more sorted suggested hashtags are ordered based on a range from a frequent usage to a seldom usage; and
overwrite the hashtag cache with the one or more sorted suggested hashtags.

5. The computing device of claim 1, wherein the one or more processors are further configured to:
detect a configuration request to order the second set of one or more suggested hashtags based on a recentness of usage; and
provide the configuration request to the communication application.

6. The computing device of claim 5, wherein the one or more processors are further configured to:

transmit the configuration request to the hashtag source;
receive one or more sorted suggested hashtags, wherein the one or more sorted suggested hashtags are ordered based on a range from a recent usage to a distant usage; and
overwrite the hashtag cache with the one or more sorted suggested hashtags.

7. The computing device of claim 1, wherein the one or more processors are further configured to:
detect a continued input to filter the first set of one or more suggested hashtags, wherein the continued input includes one or more alphanumeric characters; and
provide the continued input to the communication application.

8. The computing device of claim 7, wherein the one or more processors are further configured to:
search the hashtag cache for a focused subset of the first set of one or more suggested hashtags, wherein the focused subset of the first set of one or more suggested hashtags match the first input and the continued input; and
provide the focused subset of the first set of one or more suggested hashtags to update the presentation by the communication application.

9. The computing device of claim 1, wherein the one or more processors are further configured to:
parse a content of the second communication to identify the context information associated with the second communication; and
transmit the context information to the hashtag source to prompt the hashtag source to generate the second hashtag based on the context information.

10. The computing device of claim 9, wherein the context information includes one or more of a topic, a subject, a category, an interest, a role, a location, and a status associated with the second communication.

11. A method executed on a computing device for providing automated hashtag suggestions to categorize a communication, the method comprising:
detecting a first input to categorize a first communication with a hashtag, wherein the first input starts with a hashtag character;
querying an external source for a first set of one or more suggested hashtags for the first communication through a search application programming interface (API), wherein the search API translates commands between a communication application and the external source;
receiving the first set of one or more suggested hashtags for the first communication from the external source through the search API;
storing the first set of one or more suggested hashtags for the first communication in a hashtag cache;
presenting the first set of one or more suggested hashtags for the first communication, wherein the first set of the one or more suggested hashtags are retrieved from the hashtag cache;
in response to receiving a selection of one suggested hashtag from the first set of one or more suggested hashtags:
associate the first communication with the selected one suggested hashtag;
transmit the selected one suggested hashtag to a hashtag source separate from the external source;
identify an additional communication categorized with the selected one suggested hashtag and an additional hashtag also associated with the additional communication, the additional hashtag being different from the selected one suggested hashtag; and
store the additional hashtag in the hashtag cache; and
in response to receiving a second input from a participant to categorize a second communication with a hashtag, query the hashtag cache and the hashtag source for a second set of one or more suggested hashtags for the second communication and provide the second set of the one or more suggested hashtags for the second communication to be displayed to the participant, the second set of one or more suggested hashtags for the second communication including the additional hashtag and another hashtag obtained from the hashtag source, wherein querying the hashtag source includes transmitting, to the hashtag source, a request to select the another hashtag based on at least one selected from a group consisting of (a) previous usage of hashtags associated with account information of the participant, (b) a recentness of usage of hashtags, (c) a frequency of usage of hashtags, and (d) context information associated with the second communication.

12. The method of claim 11, further comprising:
detecting an action to categorize the first communication with a new hashtag; and
transmitting the new hashtag to the hashtag source.

13. The method of claim 11, further comprising:
detecting a request to transmit one or more hashtags used to categorize one or more of the first communication and one or more other communications;
searching the first communication and the one or more other communications for the one or more hashtags used to categorize one or more of the first communication and one or more other communications; and
transmitting, through the search API, the one or more hashtags to the hashtag source.

14. A hardware computer-readable memory device with instructions stored thereon for providing automated hashtag suggestions to categorize a communication, the instructions comprising:
detecting a first input to categorize a first communication with a hashtag, wherein the first input starts with a hashtag character;
querying an external source for a first set of one or more suggested hashtags for the first communication through a search application programming interface (API);
receiving the first set of one or more suggested hashtags for the first communication from the external source through the search API;
storing the first set of one or more suggested hashtags for the first communication in a hashtag cache;
presenting the first set of one or more suggested hashtags first communication, wherein the first set of one or more suggested hashtags are retrieved from the hashtag cache;
in response to receiving a selection of one suggested hashtag from the first set of one or more suggested hashtags:
associate the first communication with the selected one suggested hashtag;
transmit the selected one suggested hashtag to a hashtag source separate from the external source;
identify an additional communication categorized with the selected one suggested hashtag and an additional hashtag also associated with the additional communication, the additional hashtag being different from the selected one suggested hashtag; and
store the additional hashtag in the hashtag cache; and
in response to receiving a second input from a participant to categorize a second communication with a hashtag, query the hashtag cache and the hashtag source for a second set of one or more suggested hashtags for the second communication and provide the second set of one or more suggested hashtags or the second communication to be displayed to the participant, the second set of one or more suggested hashtags for the second communication including the additional hashtag and another hashtag obtained from the hashtag source, wherein querying the hashtag source includes transmitting, to the hashtag source, a request to select the another hashtag based on at least one selected from a group consisting of (a) previous usage of hashtags associated with account information of the participant, (b) a recentness of usage of hashtags, (c) a frequency of usage of hashtags, and (d) context information associated with the second communication.

15. The hardware computer-readable memory device of claim 14, wherein the instructions further comprise:
detecting a continued input to filter the first set of one or more suggested hashtags, wherein the continued input includes one or more alphanumeric characters;
searching the hashtag cache for a focused subset of the first set of one or more suggested hashtags, wherein the focused subset of the first set of one or more suggested hashtags match the first input and the continued input; and
overwriting a presentation of the one more suggested hashtags with the focused subset of the first set of one or more suggested hashtags.

* * * * *